United States Patent
Ji et al.

(10) Patent No.: US 11,200,696 B2
(45) Date of Patent: Dec. 14, 2021

(54) METHOD AND APPARATUS FOR TRAINING 6D POSE ESTIMATION NETWORK BASED ON DEEP LEARNING ITERATIVE MATCHING

(71) Applicant: TSINGHUA UNIVERSITY, Beijing (CN)

(72) Inventors: Xiangyang Ji, Beijing (CN); Gu Wang, Beijing (CN); Yi Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/023,919

(22) Filed: Sep. 17, 2020

(65) Prior Publication Data

US 2021/0004984 A1 Jan. 7, 2021

Related U.S. Application Data (63) Continuation of application No. PCT/CN2019/106993, filed on Sep. 20, 2019.

(30) Foreign Application Priority Data

Sep. 25, 2018 (CN) .......................... 201811114456.5

(51) Int. Cl.
  *G06T 7/73* (2017.01)
  *G06K 9/62* (2006.01)
  *G06T 7/11* (2017.01)

(52) U.S. Cl.
  CPC .............. *G06T 7/75* (2017.01); *G06K 9/6256* (2013.01); *G06T 7/11* (2017.01); *G06T 2207/20081* (2013.01); *G06T 2207/20084* (2013.01)

(58) Field of Classification Search
  CPC ............. G06K 9/00208; G06K 9/6256; G06K 9/6271; G06T 2207/20081;
  (Continued)

(56) References Cited

U.S. PATENT DOCUMENTS 8,744,169 B2    6/2014   Othmezouri et al.
10,235,771 B2 *   3/2019   Rad ..................... G06K 9/00208
(Continued)

FOREIGN PATENT DOCUMENTS

CN     104851094 A    8/2015
CN     106846382 A    6/2017
(Continued)

OTHER PUBLICATIONS

Zeng, Andy, et al. "Multi-view self-supervised deep learning for 6d pose estimation in the amazon picking challenge." 2017 IEEE international conference on robotics and automation (ICRA). IEEE, 2017. (Year: 2017).*

(Continued)

*Primary Examiner* — Bobbak Safaipour
(74) *Attorney, Agent, or Firm* — Scully Scott Murphy & Presser (57) ABSTRACT

The present disclosure relates to a method and an apparatus for training a 6D pose estimation network based on deep learning iterative matching. The method includes: obtaining a rendered image and a first segmentation mask of a target object by using a 3D model and an initial 6D pose estimation of the target object; inputting the rendered image, the first segmentation mask, an observed image of the target object, and a second segmentation mask of the target object in the observed image into a deep convolutional neural network to obtain a 6D pose estimation, a third segmentation mask and an optical flow; and performing said obtaining and said inputting again by updating the initial 6D pose estimation (Continued)

using the obtained relative 6D pose estimation and replacing the second segmentation mask with the third segmentation mask, to iteratively train the deep convolutional neural network.

17 Claims, 4 Drawing Sheets

(58) Field of Classification Search
CPC ... G06T 2207/20084; G06T 7/11; G06T 7/73; G06T 7/75
See application file for complete search history.

(56) References Cited

U.S. PATENT DOCUMENTS

| | | | |
|---|---|---|---|
| 2018/0137644 A1 | 5/2018 | Rad et al. | |
| 2019/0220992 A1* | 7/2019 | Li | G06T 7/11 |
| 2019/0304134 A1* | 10/2019 | Mauchly | G06T 15/20 |
| 2020/0311956 A1* | 10/2020 | Choi | B25J 9/1697 |
| 2021/0264196 A1* | 8/2021 | Abbeloos | G06K 9/00791 |
| 2021/0283784 A1* | 9/2021 | Tan | B25J 17/025 |
| 2021/0293643 A1* | 9/2021 | Correll | B25J 15/0009 |
| 2021/0295507 A1* | 9/2021 | Nie | G06K 9/4638 |

FOREIGN PATENT DOCUMENTS

| | | |
|---|---|---|
| CN | 106897697 A | 6/2017 |
| CN | 107622257 A | 1/2018 |
| CN | 108171748 A | 6/2018 |
| CN | 109215080 A | 1/2019 |

OTHER PUBLICATIONS

Do, Thanh-Toan, et al. "Deep-6dpose: Recovering 6d object pose from a single rgb image." arXiv preprint arXiv: 1802.10367 (2018). (Year: 2018).*

International Search Report and Written Opinion dated Dec. 18, 2019 received in International Patent Application No. PCT/CN2019/106993 together with an English language translation.

Cao, X. et al., "3D Spatial Reconstruction and Communication from Vision Field", IEEE Xplore, Dec. 31, 2012, pp. 5445-5448.

First Office Action dated Mar. 24, 2020 received in Chinese Patent Application No. CN 201811114456.5 together with an English language translation.

Notification to Grant Patent Right for Invention dated Jul. 14, 2020 received in Chinese Patent Application No. CN 201811114456.5 together with an English language translation.

* cited by examiner

METHOD AND APPARATUS FOR TRAINING 6D POSE ESTIMATION NETWORK BASED ON DEEP LEARNING ITERATIVE MATCHING

CROSS-REFERENCE TO RELATED APPLICATIONS

This present application is a continuation of International Application No. PCT/CN2019/106993, filed on Sep. 20, 2019, which claims priority to Chinese Patent Application No. 201811114456.5 entitled "METHOD AND APPARATUS FOR TRAINING 6D POSE ESTIMATION NETWORK BASED ON DEEP LEARNING ITERATIVE MATCHING" and filed with the CNIPA on Sep. 25, 2018, both of which are hereby incorporated by reference in their entireties.

TECHNICAL FIELD

The present disclosure relates to the field of artificial intelligence, and in particular to a method and an apparatus for training a 6D pose estimation network based on deep learning iterative matching.

BACKGROUND

It is very important in many practical applications to acquire a pose of an object in the 3D space from a 2D image. For example, in the robot field, identifying a 6D pose of an object, i.e., a 3D position and a 3D orientation of the object, can provide key information for tasks such as robotic grasping or motion planning In virtual reality, accurate 6D object pose estimation may enable a person to interact with the object.

Traditionally, a depth camera is commonly used for object pose estimation. However, depth cameras have many limitations, for example, limitations on frame rate, field of view, resolution, depth range, and power consumption, making the technologies relying on depth difficult to detect small, transparent or fast moving objects. However, it is still very challenging to estimate 6D object poses using an RGB-only image, because factors such as illumination, pose changes and occlusions can affect the appearance of objects in the image. A robust 6D pose estimation method also needs to handle both textured and texture-less objects.

Recently, some deep learning based methods have been proposed for 6D object pose estimation using an RGB image, and are generally implemented by means of extending methods for object detection or segmentation. These methods can greatly improve the performance of 6D object pose estimation compared to the conventional methods only using an RGB image, but are still inferior to RGB-D based methods. Therefore, these methods usually need to further use depth information to improve the initial pose estimation via ICP (Iterative Closest Point). However, ICP is sensitive to the initial estimation, and may converge to local optima, especially in the case of occlusion. Furthermore, ICP relies on depth information, thus is also limited by depth cameras.

SUMMARY

In view of this, the present disclosure provides a method and an apparatus for training a 6D pose estimation network based on deep learning iterative matching, aiming to solve the problems that the 6D pose estimation of an object obtained by the existing deep learning based methods is not accurate enough and that there is a lack of a method for improving the 6D pose estimation without relying on depth information.

In one aspect, a method for training a 6D pose estimation network based on deep learning iterative matching is provided. The method includes: obtaining a rendered image and a first segmentation mask of a target object by using a 3D model and an initial 6D pose estimation of the target object; inputting the rendered image, the first segmentation mask, an observed image of the target object, and a second segmentation mask of the target object in the observed image into a deep convolutional neural network to obtain a relative 6D pose estimation, a third segmentation mask and an optical flow; and performing said obtaining and said inputting again by updating the initial 6D pose estimation using the obtained relative 6D pose estimation and replacing the second segmentation mask with the third segmentation mask, to iteratively train the deep convolutional neural network.

In another aspect, an apparatus for training a 6D pose estimation network based on deep learning iterative matching is provided. The apparatus includes: an obtaining module, configured to obtain a rendered image and a first segmentation mask of a target object by using a 3D model and an initial 6D pose estimation of the target object; an input module, configured to input the rendered image, the first segmentation mask, an observed image of the target object, and a second segmentation mask of the target object in the observed image into a deep convolutional neural network to obtain a relative 6D pose estimation, a third segmentation mask and an optical flow; and an iteration module, configured to perform the above steps again by updating the initial 6D pose estimation using the obtained relative 6D pose estimation and replacing the second segmentation mask with the third segmentation mask, to iteratively train the deep convolutional neural network.

In another aspect, an apparatus for training a 6D pose estimation network based on deep learning iterative matching is provided. The apparatus includes: a processor; and a memory configured to store processor executable instructions. The processor is configured to perform the above described method when executing the processor-executable instructions.

In another aspect, a non-volatile computer readable storage medium having computer program instructions stored thereon is provided. The computer program instructions, when being executed by a processor, perform the method described above.

In the training method provided by the embodiments of the present disclosure, the initial 6D pose estimation can be improved to get the accurate estimation result without relying on depth information. Since the environmental conditions such as illumination and occlusion can be adjusted during rendering according to requirements, the method is robust to problems such as illumination and occlusion. Moreover, since a segmentation mask can be acquired correspondingly either with or without texture, the method can process both textured and texture-less objects.

Other features and aspects of the present disclosure will become apparent from the following detailed description of exemplary embodiments with reference to the accompanying drawings.

BRIEF DESCRIPTION OF DRAWINGS

The accompanying drawings, which are included in the description and constitute a part of the description, together with the description illustrate exemplary embodiments, features, and aspects of the present disclosure, and serve to explain the principles of the present disclosure.

DESCRIPTION OF EMBODIMENTS

Various exemplary embodiments, features, and aspects of the present disclosure will be described in detail below with reference to the accompanying drawings. Like reference signs in the drawings denote functionally identical or similar elements. Although various aspects of the embodiments are shown in the drawings, the drawings need not be drawn to scale unless specifically indicated.

The expression "exemplary" as used herein means "serving as an example or embodiment" or "illustrative". Any embodiment described herein as "exemplary" is not necessary to be construed as being superior to or better than other embodiments.

In addition, for better illustration of the present disclosure, numerous specific details are given in the following detailed embodiments. It should be understood by any person skilled in the art that the present disclosure can also be implemented without certain specific details. In some embodiments, methods, means, elements, and circuitry well known to any person skilled in the art are not described in detail, in order to highlight the subject matter of the present disclosure.

Figure 1A:
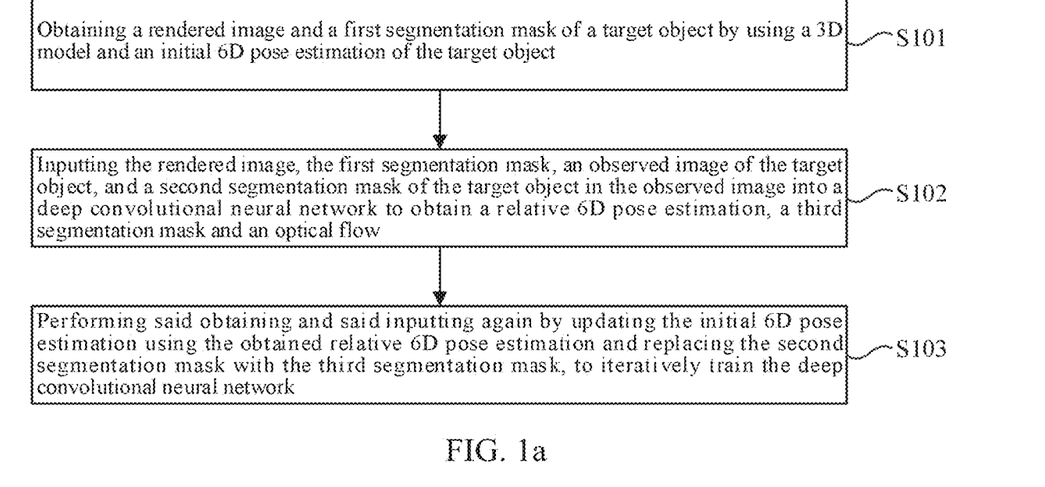
FIG. 1a illustrates a flowchart of a method for training a 6D pose estimation network based on deep learning iterative matching according to an embodiment of the present disclosure.
Figure 1B:
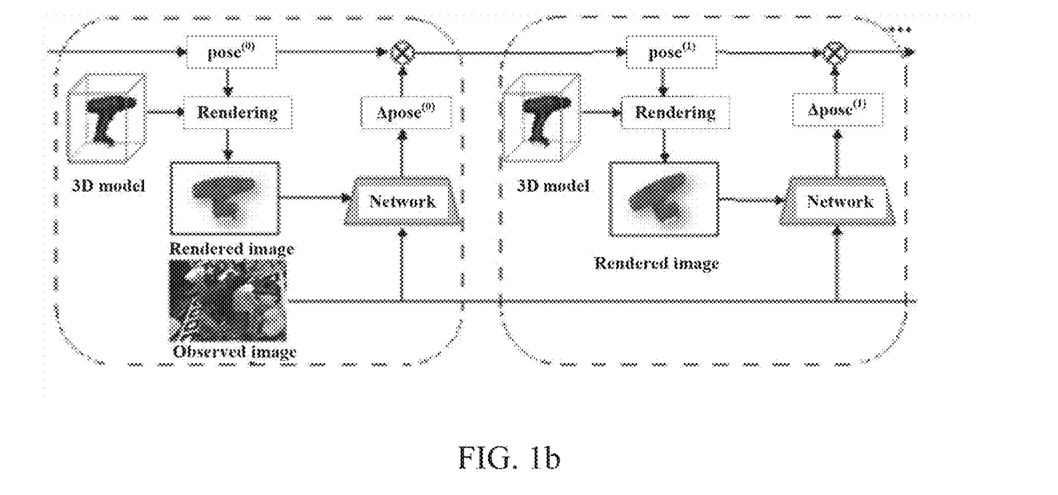
FIG. 1b illustrates a schematic diagram of a method for training a 6D pose estimation network based on deep learning iterative matching according to an embodiment of the present disclosure.

FIG. 1a illustrates a flowchart of a method for training a 6D pose estimation network based on deep learning iterative matching according to an embodiment of the present disclosure. FIG. 1b illustrates a schematic diagram of the method. As shown in FIG. 1a, the method includes steps as follows.

At step S101, a rendered image and a first segmentation mask of a target object are obtained by using a 3D model and an initial 6D pose estimation $pose^{(0)}$ of the target object.

The target object may be any object to be pose-estimated during network training, e.g., an object or a person. The initial 6D pose estimation $pose^{(0)}$ of the target object may be a current initial value, or an initial value obtained by other estimation methods of the related art. The rendered image and the first segmentation mask of the target object may be obtained by rendering based on the 3D model and the initial 6D pose estimation $pose^{(0)}$ of the target object. The first segmentation mask may be a segmentation mask of the target object in the rendered image.

At step S102, the rendered image, the first segmentation mask, an observed image of the target object, and a second segmentation mask of the target object in the observed image are inputted into a deep convolutional neural network to obtain a relative 6D pose estimation $\Delta pose^{(0)}$, a third segmentation mask and an optical flow.

The observed image of the target object may be an image captured by photographing an actual target object. The second segmentation mask may be obtained by segmentation and tagging for the observed image. The segmentation and tagging may be achieved based on an object segmentation method in the related art. The deep convolutional neural network may return the 6D pose estimation, the third segmentation mask, and the optical flow respectively in three branches for iterative training.

At step S103, steps S101 and S102 are performed again by updating the initial 6D pose estimation $pose^{(0)}$ in step S101 using the obtained relative 6D pose estimation $\Delta pose^{(0)}$ and replacing the second segmentation mask in step S102 with the third segmentation mask, to iteratively train the deep convolutional neural network. The updating means that a new 6D pose estimation is obtained by calculation of the obtained relative 6D pose estimation $\Delta pose^{(0)}$ and the initial 6D pose estimation $pose^{(0)}$, as an input of the next iteration. Any person skilled in the art can achieve the updating by means of relevant technical means, and the present disclosure does not limit the specific implementation of the updating.

Before performing steps S101 and S102 again, network parameters of the deep convolutional neural network may be adjusted based on a loss function. When the iterative training is performed to satisfy a training condition, the training may be regarded as being completed. The training condition may be set based on actual requirements, for example, a value of the loss function may be smaller than a threshold value, or the number of optimization steps reaches a threshold value, and the like. The present disclosure does not limit the training condition.

In the training method provided by the embodiments of the present disclosure, the initial 6D pose estimation can be improved to get the accurate estimation result without relying on the depth information. Since environmental conditions such as illumination and occlusion can be adjusted during rendering according to requirements, the method is robust to problems such as illumination and occlusion. Moreover, since a segmentation mask can be acquired correspondingly either with or without texture, the method can process both textured and texture-less objects.

For two public test benchmark datasets LINEMOD and Occluded LINEMOD, the present method has a significant performance improvement compared with the previous methods.

In one possible implementation, iteratively training the deep convolutional neural network may include: iteratively training the deep convolutional neural network using an SGD optimization algorithm.

The SGD (Stochastic Gradient Descent) optimization algorithm may be used to train the deep convolutional neural network, and optimize the loss function until convergence, so as to achieve a better training effect.

In one possible implementation, inputting the rendered image, the first segmentation mask, the observed image of the target object, and the second segmentation mask of the target object in the observed image into the deep convolutional neural network may include: enlarging the rendered image of the target object together with a rectangular region surrounding the second segmentation mask of the target object in the observed image, in such a manner that a 2D projection center of the 3D model of the target object is located at a center of the enlarged rendered image, and that the target object in the observed image is completely located in the enlarged observed image; and inputting the enlarged rendered image, the first segmentation mask, the enlarged observed image, and the second segmentation mask of the target object in the observed image into the deep convolutional neural network.

Figure 2:
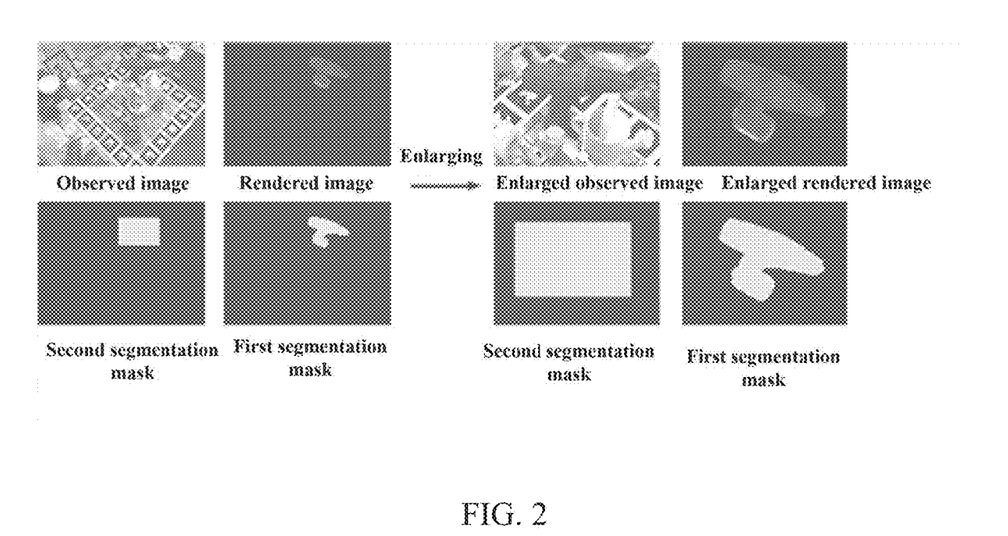
FIG. 2 illustrates a schematic diagram of one example of an enlargement operation according to an embodiment of the present disclosure.

FIG. 2 shows a schematic diagram of one example of the enlargement operation according to an embodiment of the present disclosure.

As shown in FIG. 2, an enlarged observed image is obtained after the rectangular region surrounding the second segmentation mask in the observed image is enlarged, and an enlarged rendered image is obtained after the rendered image is enlarged. Herein, enlargement ratios of the observed image and the rendered image may be the same. In the enlarged rendered image, the 2D projection center of the 3D model of the target object is located at the center of the enlarged rendered image, and the target object in the observed image is completely located in the enlarged observed image.

Since the deep convolutional neural network in this embodiment processes pairs of images (the rendered image and the observed image) that are obtained by zooming and centering on the target object, the impact of the object size is small and the estimation result is more accurate.

Figure 3:
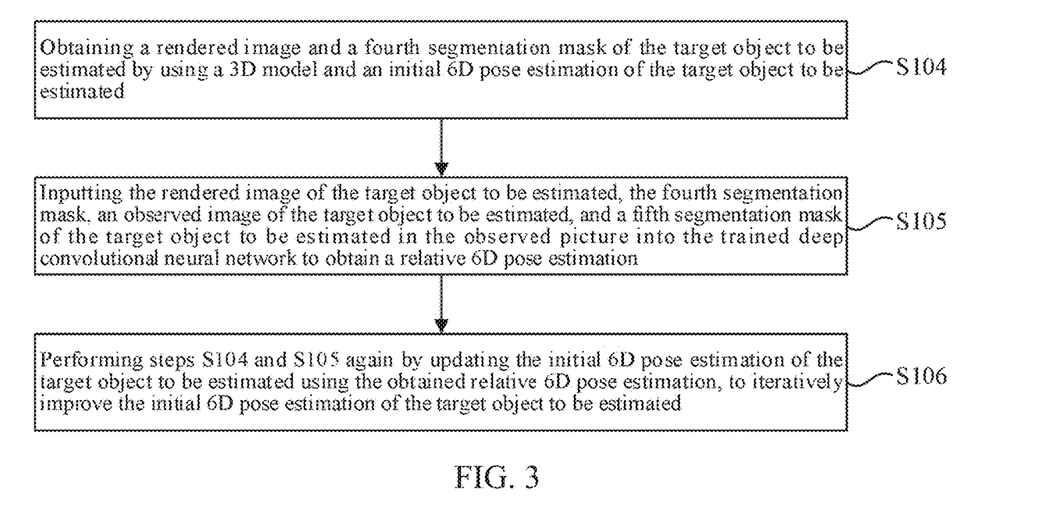
FIG. 3 illustrates a flowchart of a training method of a 6D pose estimation model based on deep learning iterative matching according to an embodiment of the present disclosure.

FIG. 3 illustrates a flowchart of a training method of a 6D pose estimation model based on deep learning iterative matching according to an embodiment of the present disclosure. As shown in FIG. 3, the method further includes: performing a 6D pose estimation, using the trained deep convolutional neural network, on a target object to be estimated by the following steps.

At step S104, a rendered image and a fourth segmentation mask of the target object to be estimated are obtained by using a 3D model and an initial 6D pose estimation of the target object to be estimated.

At step S105, the rendered image of the target object to be estimated, the fourth segmentation mask, an observed image of the target object to be estimated, and a fifth segmentation mask of the target object to be estimated in the observed image are inputted into the trained deep convolutional neural network to obtain a 6D pose estimation.

At step S106, the above steps S104 and S105 are performed again by updating the initial 6D pose estimation of the target object to be estimated using the obtained relative 6D pose estimation, to iteratively improve the initial 6D pose estimation of the target object to be estimated.

Steps S104, S105 and S106, as a test or use process of the network, are performed after the network iterative training is completed. During the test or use process, two branches for the optical flow and the segmentation mask of the deep convolutional neural network, training for which has been completed in steps S101-S103, are removed, and steps S104, S105 and S106 are repeatedly performed until a preset iteration convergence condition is achieved. Then, a 6D pose estimation result can be obtained. The present disclosure does not limit the iteration convergence condition.

In one possible implementation, inputting the rendered image of the target object to be estimated, the fourth segmentation mask, the observed image of the target object to be estimated, and the fifth segmentation mask of the target object to be estimated in the observed image into the trained deep convolutional neural network may include: enlarging the rendered image of the target object to be estimated together with a rectangular region surrounding the fifth segmentation mask of the target object to be estimated in the observed image of an initial prediction, in such a manner that the 2D projection center of the 3D model of the target object to be estimated is located at the center of the enlarged rendered image and that the target object to be estimated in the observed image is located completely in the enlarged observed image; and inputting the enlarged rendered image, the fourth segmentation mask, the enlarged observed image, and the fifth segmentation mask of the target object to be estimated in the observed image into the trained deep convolutional neural network.

The fifth segmentation mask of the initial prediction may be a segmentation mask obtained by other related technologies. Through the similar enlargement process as that described above, the estimation result is less affected by the object size and thus more accurate.

In one possible implementation, the relative 6D pose estimation outputted by the deep convolutional neural network may be represented by a relative pose transformation between the initial pose and the target pose, where the target pose is the pose of the target object in the observed image and may be manually labeled or obtained by other related pose estimation techniques. The relative pose transformation includes a relative rotation transformation and a relative translation transformation, and may be represented in a manner that decouples the translation and the rotation.

For the relative rotation transformation, a center point of the target object in a camera coordinate system may be taken as an origin of the camera coordinate system, so that the rotation does not affect the translation of the target object in the camera coordinate system and thereby the rotation is decoupled from the translation. The relative rotation transformation may be represented by a transformation matrix.

The relative translation transformation may be represented by an offset and a scale change in the 2D pixel space, rather than being directly represented by a coordinate difference in the 3D space. The relative translation transformation may be represented by a transformation vector.

For example, it is assumed that the relative translation transformation is $t_A=(v_x, v_y, v_z)$, where $v_x$ and $v_y$ respectively represent amounts of pixel movement in x direction and y direction of the target object in the rendered image relative to the target object in the observed image, and $v_z$ represents a scale change factor of the target object. In addition, it is assumed that the source translation of the target object in the rendered image with respect to the coordinate origin and the target translation of the target object in the observed image with respect to the coordinate origin are respectively $t_{src}=(x_{src}, y_{src}, z_{src})$ and $t_{tgt}=(x_{tgt}, y_{tgt}, z_{tgt})$. Then, the relative translation transformation can be obtained by the following formulas:

$$v_x = f_x(x_{tgt}/z_{tgt} - x_{src}/z_{src}),$$

$$v_y = f_y(y_{tgt}/z_{tgt} - y_{src}/z_{src}), \text{ and}$$

$$v_z = \log(z_{src}/z_{tgt}),$$

where $f_x$ and $f_y$ each denote a focal length of the camera, and the scale change factor $v_z$ is expressed by a ratio so as to be independent of an absolute scale of the target object. The logarithm is used to make $v_z=0$ correspond to the scale being unchanged. Considering that both $f_x$ and $f_y$ are fixed constants, they may be regarded as 1 during the actual training of the network.

Through the representation of the decoupled relative rotation transformation and relative translation transformation, the network can be trained more easily and can be applied to zero-shot learning, that is, an improvement of 6D pose estimation can be applied to a previously unseen object.

In one possible implementation, the deep convolutional neural network may be constructed based on a FlowNet model for predicting the optical flow. The basic structure of the deep convolutional neural network may be a structure of a simple version of the FlowNet for predicting the optical flow, in which the branch of the FlowNet for predicting the optical flow is retained, a segmentation mask is added to the input portion, and the branch for predicting the segmentation mask and the branch for predicting the 6D pose estimation are added to the output portion. The branch for the optical flow and the branch for the segmentation mask only take effect during the training, and serve as an assistance for the training, so that the training is more stable. During testing and application, one can just keep the branch for the 6D pose estimation and discard the rest branches.

The input of the network may include eight channels, i.e., three channels for the observed image, one channel for the segmentation mask of the observed image, three channels for the rendered image, and one channel for the segmentation mask of the rendered image. The network weight for the added input segmentation mask may be initialized to 0, other parts, if newly added layers, may be initialized randomly, and the remaining layers that are the same as those in the original FlowNet may be initialized as the original weight.

When using a network to perform pose estimation, a fully connected layer having 3 neurons as outputs may be adopted for the relative translation transformation, and a fully connected layer having 4 neurons as outputs may be adopted for the relative rotation transformation, where 4 indicates that a relative rotation transformation represented by a quaternion.

Figure 4:
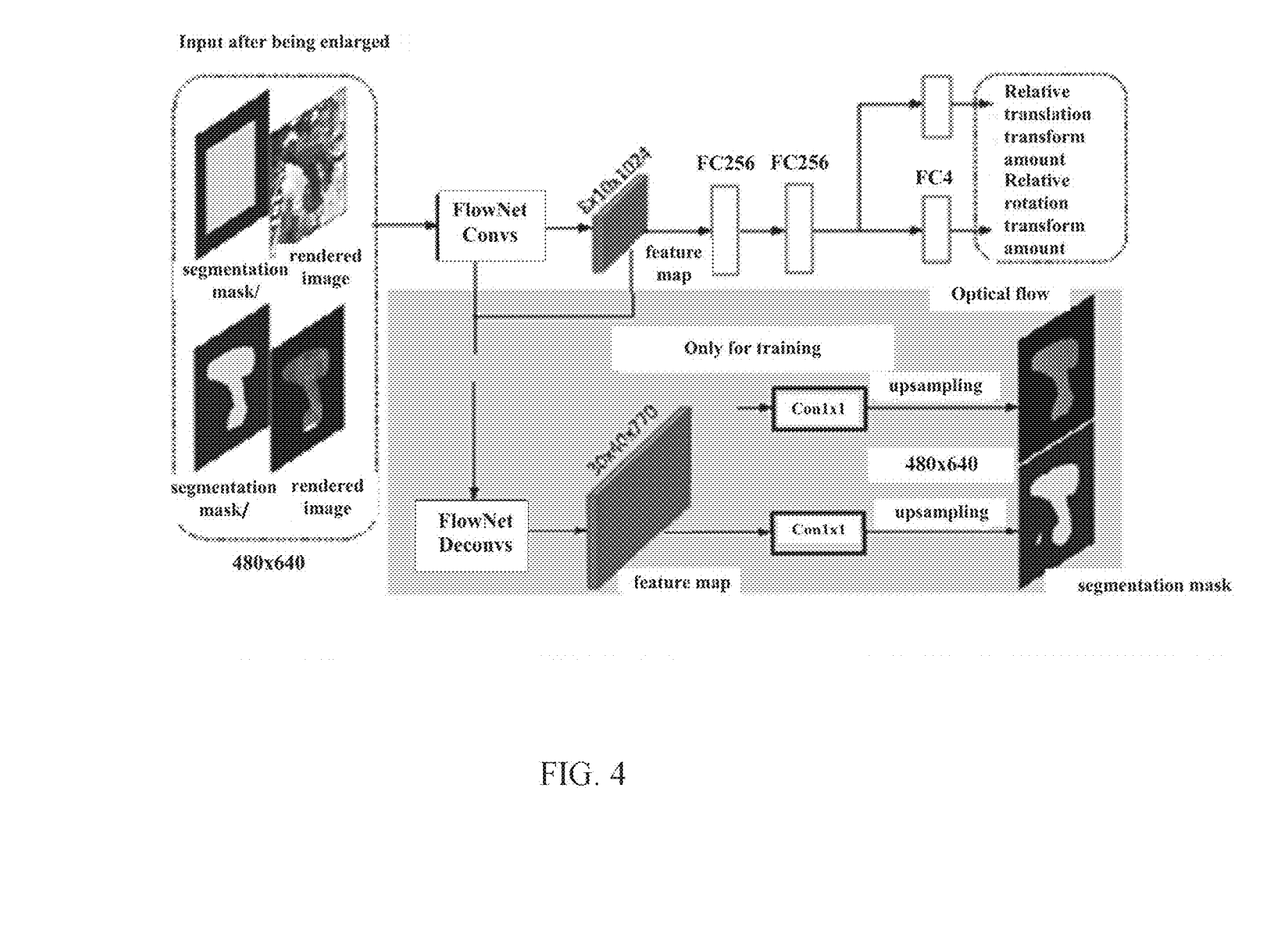
FIG. 4 illustrates a schematic structural diagram of one example of a deep convolutional neural network according to an embodiment of the present disclosure.

FIG. 4 illustrates a schematic structural diagram of one example of a deep convolutional neural network according to an embodiment of the present disclosure.

In this example, the network is based on FlowNet Convs and FlowNet DeConvs (FlowNet convolution and de-convolution) models, and during training, inputs the enlarged rendered image and the segmentation mask thereof, and the enlarged observed image and the segmentation mask thereof into the FlowNet Convs model, and obtains a relative 6D pose estimation (including a relative rotation transformation (Rotation) and a relative translation transformation (Translation)). The FlowNet DeConvs model obtains the optical flow and a segmentation mask (the third segmentation mask stated above) based on a feature map (Featuremap) that is obtained based on the FlowNet Convs model. After the iterative training is completed, testing is performed, and when a pose estimation is performed using the network, the two branches for the optical flow and the segmentation mask are removed.

In one possible implementation, in the iterative training, a loss function is constituted based on a weighted sum of loss functions of the three branches for the 6D pose estimation, the optical flow and the third segmentation mask. The branches for the optical flow and for the third segmentation mask are only used for the iterative training.

For example, the loss function may be used as follows:

$L = \alpha L_{pose} + \beta L_{flow} + \gamma L_{mask}$, where $L_{pose}$ denotes the loss function of the branch for the 6D pose estimation, $\alpha$ denotes a weight coefficient of the loss function of the branch for the 6D pose estimation, $L_{flow}$ denotes the loss function of the branch for the optical flow, $\beta$ denotes a weight coefficient of the loss function of the branch for the optical flow, $L_{mask}$ denotes the loss function of the branch for the third segmentation mask, and $\gamma$ denotes a weight coefficient of the loss function of the branch for the third segmentation mask.

The weight coefficients of different branches may be set as required, for example, may be set as follows: $\alpha=0.1$, $\beta=0.25$, $\gamma=0.03$, $L_{flow}$ is the same as that in the FlowNet model, and $L_{mask}$ can adopt a sigmoid cross-entropy loss function.

In one possible implementation, assuming that the target pose for the observed image is $p=[R|t]$ and the estimated pose is $\hat{p}=[\hat{R}|\hat{t}]$, the loss function of the branch for the 6D pose estimation may be:

$$L_{pose}(p, \hat{p}) = \frac{1}{n}\sum_{j=1}^{n} L_1\big((Rx_j + t) - (\hat{R}x_j + \hat{t})\big),$$

where R denotes the target rotation, $\hat{R}$ denotes the estimated rotation, t denotes the target translation, $\hat{t}$ denotes the estimated translation, $x_j$ denotes coordinates of the $j^{th}$ point in the 3D model of the target object, $L_1$ denotes 1-norm, and n denotes the total number of points in the 3D model. R, $\hat{R}$, t, and $\hat{t}$ denote the absolute rotation and absolute translation with respect to the origin of coordinates, and $\hat{R}$ and $\hat{t}$ of the estimated pose can be obtained by superimposing upon the initial pose, the relative rotation transformation and the relative translation transformation outputted by the deep convolutional neural network.

In one possible implementation, when the number of images for training and the segmentation mask thereof is greater than or equal to a preset number, the branch for optical flow and/or the branch for third segmentation mask may be removed during the iterative training. In this case, the loss function also needs to be adjusted accordingly. The preset number may be set according to actual situations, and is not limited in the present disclosure.

An embodiment of the present disclosure provides an apparatus for training a 6D pose estimation network based on deep learning iterative matching, which includes: a processor; a memory configured to store processor-executable instructions. The processor is configured to perform the above methods when executing the processor-executable instructions.

An embodiment of the present disclosure provides a non-volatile computer readable storage medium having computer program instructions stored thereon. The computer program instructions, when being executed by a processor, perform the above methods.

Figure 5:
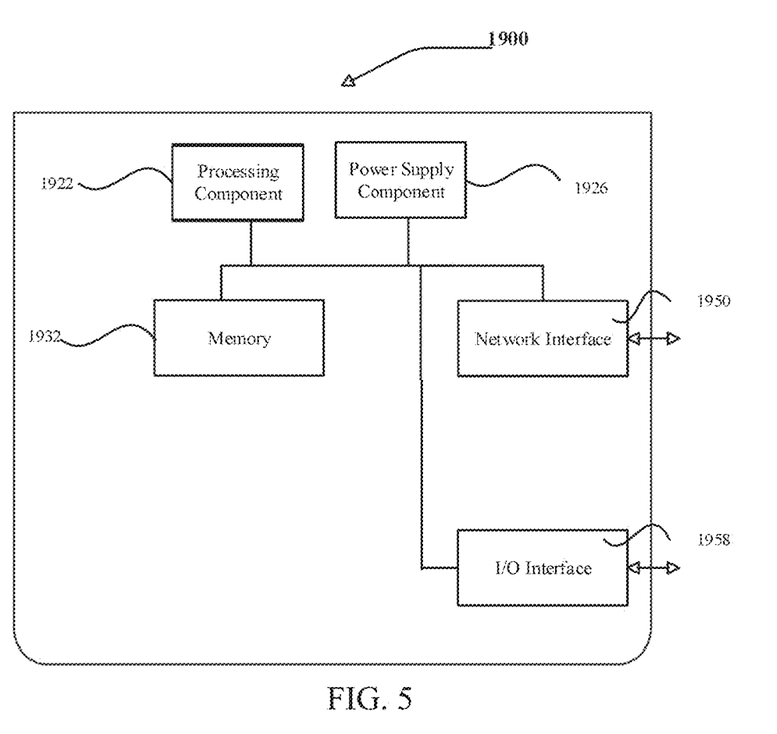
FIG. 5 is a block diagram of an apparatus 1900 for training a 6D pose estimation network based on deep learning iterative matching according to an exemplary embodiment.

FIG. 5 is a block diagram of an apparatus 1900 for training a 6D pose estimation network based on deep learning iterative matching according to an exemplary embodiment. For example, the apparatus 1900 may be a server. Referring to FIG. 5, the apparatus 1900 includes: a processing component 1922 including one or more processors; and storage resources represented by a memory 1932 for storing instructions such as applications executable by the processing component 1922. The applications stored in the memory 1932 may include one or more modules each corresponding to a set of instructions. In addition, the processing component 1922 is configured to execute instructions to perform the methods described above.

The apparatus 1900 may further include a power supply component 1926 configured to perform power supply management of the apparatus 1900, a wired or wireless network interface 1950 configured to connect the apparatus 1900 to the network, and an input/output (I/O) interface 1958. The apparatus 1900 may operate based on an operating system stored in the memory 1932, such as Windows Server™, Mac OS X™, Unix™, Linux™, FreeBSD™, or the like.

In an exemplary embodiment, a non-volatile computer readable storage medium is further provided, such as the memory 1932 including computer program instructions executable by the processing component 1922 of the apparatus 1900 to perform the above methods.

The present disclosure may be a system, a method, and/or a computer program product. The computer program product may include a computer readable storage medium having computer readable program instructions thereon for causing a processor to achieve various aspects of the present disclosure.

The computer readable storage medium may be a tangible device that can retain and store instructions used by an instruction execution device. The computer-readable storage medium may be, for example but not limited to, an electrical storage device, a magnetic storage device, an optical storage device, an electromagnetic storage device, a semiconductor storage device, or any suitable combination thereof. More specific examples (a non-exhaustive listing) of the computer-readable storage medium include a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disc, a mechanical coding device such as a punched card or a convex structure in a recess on which instructions are stored, and any suitable combination thereof. The computer-readable storage medium used herein is not to be interpreted as a transient signal itself, such as a radio wave or other freely propagating electromagnetic waves, electromagnetic waves propagating through a waveguide or other transmission medium (e.g., an optical pulse through an optical fiber cable), or an electrical signal transmitted through an electrical line.

The computer readable program instructions described herein may be downloaded from a computer readable storage medium to various computing/processing devices, or to an external computer or an external storage device via a network, such as the Internet, a local area network, a wide area network and/or a wireless network. The network may include a copper transmission cable, a fiber transmission, a wireless transmission, a router, a firewall, a switch, a gateway computer, and/or an edge server. A network adapter card or a network interface in each computing/processing device receives computer readable program instructions from the network, and forwards the computer readable program instructions for storage in a computer readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages. The programming languages include object-oriented programming languages such as Smalltalk, C++ or the like, and conventional procedural programming languages, such as the "C" language or similar programming languages. The computer readable program instructions may be executed entirely on the user computer, partially on the user computer, as a separate software package, partially on the user computer and partially on the remote computer, or entirely on a remote computer or server. In situations involving the remote computer, the remote computer may be connected to the user computer through any kind of network, including a local area network (LAN) or a wide area network (WAN), or may be connected (e.g., through the Internet using an Internet service provider) to an external computer. In some embodiments, electronic circuits, such as programmable logic circuits, field programmable gate arrays (FPGAs), or programmable logic arrays (PLAs) are customized personally using state information of computer readable program instructions, and these electronic circuits may execute computer readable program instructions to implement various aspects of the present disclosure.

Various aspects of the present disclosure are described herein with reference to flowcharts and/or block diagrams of methods, apparatuses (systems) and computer program products according to embodiments of the disclosure. It should be understood that each block of the flowcharts and/or block diagrams and combinations of blocks in the flowcharts and/or block diagrams may be implemented by computer readable program instructions.

These computer readable program instructions may be provided to a processor of a general purpose computer, a special purpose computer or other programmable data processing apparatus to produce a machine, such that the instructions, when executed by the processor of the computer or other programmable data processing apparatus, generate an apparatus for implementing the functions/actions specified by block(s) in the flowchart and/or block diagram. The computer readable program instructions may also be stored in a computer readable storage medium, and the instructions enable the computer, the programmable data processing apparatus, and/or other devices to function in a specific manner, so that the computer readable medium storing the instructions includes an article of manufacture including instructions for implementing various aspects of the functions/actions specified by block(s) in the flowchart and/or block diagram.

The computer readable program instructions may also be loaded onto a computer, other programmable data processing apparatus or other device, causing a series of operational steps to be performed on the computer, other programmable data processing apparatus or other device to generate a computer-implemented process, in such a manner that functions/actions specified by block(s) in the flowchart and/or block diagram can be implemented by the instructions executed on the computer, other programmable data processing apparatus or other apparatus.

The flowcharts and block diagrams in the drawings illustrate architectures, functionalities, and operations of possible implementations of systems, methods and computer program products according to various embodiments of the present disclosure. In this regard, each block in the flowchart or block diagram may represent a module, a program segment, or a part of instructions, which contains one or more executable instructions for implementing specified logical functions. In some alternative implementations, functions denoted in the blocks may also occur in an order different from that denoted in the drawings. For example, two consecutive blocks may actually be executed substantially in parallel, and they may also be executed in the reverse order, depending on concerned functions. It is also noted that each block of the block diagrams and/or flowcharts and combinations of blocks in the block diagrams and/or flowcharts may be implemented by a dedicated hardware-based system that performs specified functions or actions, or may be implemented by a combination of a dedicated hardware and computer instructions.

Various embodiments of the present disclosure have been described above, and the above description is exemplary but not exhaustive and is also not limited to the disclosed embodiments. Many modifications and variations will be apparent to any person skilled in the art without departing from the scope and spirit of the described embodiments. The choice of terms used herein is intended to best explain the principles, practical applications or technical improvements in the market of the embodiments, or to enable any person skilled in the art to understand the embodiments disclosed herein.

What is claimed is:

1. A method for training a 6D pose estimation network based on deep learning iterative matching, comprising:
    obtaining a rendered image and a first segmentation mask of a target object by using a 3D model and an initial 6D pose estimation of the target object;
    inputting the rendered image, the first segmentation mask, an observed image of the target object, and a second segmentation mask of the target object in the observed image into a deep convolutional neural network to obtain a 6D pose estimation, a third segmentation mask and an optical flow; and
    performing said obtaining and said inputting again by updating the initial 6D pose estimation using the obtained relative 6D pose estimation and replacing the second segmentation mask with the third segmentation mask, to iteratively train the deep convolutional neural network.

2. The method according to claim 1, wherein said inputting the rendered image, the first segmentation mask, the observed image of the target object, and the second segmentation mask of the target object in the observed image into the deep convolutional neural network comprises:
    enlarging the rendered image of the target object together with a rectangular region surrounding the second segmentation mask of the target object in the observed image, in such a manner that a 2D projection center of the 3D model of the target object is located at a center of the enlarged rendered image and that the target object in the observed image is completely located in the enlarged observed image; and
    inputting the enlarged rendered image, the first segmentation mask, the enlarged observed image, and the second segmentation mask of the target object in the observed image into the deep convolutional neural network.

3. The method according to claim 1, further comprising performing a 6D pose estimation, using the trained deep convolutional neural network, on a target object to be estimated by:
    obtaining a rendered image and a fourth segmentation mask of the target object to be estimated by using a 3D model and an initial 6D pose estimation of the target object to be estimated;
    inputting the rendered image of the target object to be estimated, the fourth segmentation mask, an observed image of the target object to be estimated, and a fifth segmentation mask of the target object to be estimated in the observed image into the trained deep convolutional neural network to obtain a 6D pose estimation; and
    performing said obtaining and said inputting again by updating the initial 6D pose estimation of the target object to be estimated using the obtained relative 6D pose estimation, to iteratively improve the initial 6D pose estimation of the target object to be estimated.

4. The method according to claim 3, wherein said inputting the rendered image of the target object to be estimated, the fourth segmentation mask, the observed image of the target object to be estimated, and the fifth segmentation mask of the target object to be estimated in the observed image into the trained deep convolutional neural network comprises:
    enlarging the rendered image of the target object to be estimated together with a rectangular region surrounding the fifth segmentation mask of the target object to be estimated in the observed image of an initial prediction, in such a manner that a 2D projection center of the 3D model of the target object to be estimated is located at a center of the enlarged rendered image and that the target object to be estimated in the observed image is located completely in the enlarged observed image; and
    inputting the enlarged rendered image, the fourth segmentation mask, the enlarged observed image, and the fifth segmentation mask of the target object to be estimated in the observed image into the trained deep convolutional neural network.

5. The method according to claim 1, wherein the 6D pose estimation output by the deep convolutional neural network is represented by a relative pose transformation relative to a target pose, where the target pose is a pose of the target object in the observed image, the relative pose transformation includes a relative rotation transformation and a relative translation transformation, the relative rotation transformation takes a center point of the target object in a camera coordinate system as an origin of the camera coordinate system, and the relative translation transformation is represented by an offset and a scale change in the 2D pixel space.

6. The method according to claim 1, wherein the deep convolutional neural network is constructed based on a FlowNet model for predicting the optical flow.

7. The method according to claim 1, further comprising: in said iteratively training, constituting a loss function based on a weighted sum of loss functions of three branches for the 6D pose estimation, the optical flow and the third segmentation mask, wherein the branches for the optical flow and for the third segmentation mask are only used for said iteratively training.

8. The method according to claim 7, wherein the loss function of the branch for the 6D pose estimation is:

$$L_{pose}(p, \hat{p}) = \frac{1}{n}\sum_{j=1}^{n} L_1\big((Rx_j + t) - (\hat{R}x_j + \hat{t})\big),$$

where p=[R|t] denotes a target pose, $\hat{p}=[\hat{R}|\hat{t}]$ denotes an estimated pose, R denotes the target rotation, $\hat{R}$ denotes the estimated rotation, t denotes the target translation, $\hat{t}$ denotes the estimated translation, $x_j$ denotes coordinates of a $j_{th}$ point in the 3D model of the target object, $L_1$ denotes 1-norm, and n denotes the total number of points in the 3D model.

9. An apparatus for training a 6D pose estimation network based on deep learning iterative matching, comprising:
    a processor; and
    a memory configured to store processor executable instructions, wherein the processor is configured to, when executing the processor executable instructions:
obtain a rendered image and a first segmentation mask of a target object by using a 3D model and an initial 6D pose estimation of the target object;
input the rendered image, the first segmentation mask, an observed image of the target object, and a second segmentation mask of the target object in the observed image into a deep convolutional neural network to obtain a 6D pose estimation, a third segmentation mask and an optical flow; and
perform said obtaining and said inputting again by updating the initial 6D pose estimation using the obtained relative 6D pose estimation and replacing the second segmentation mask with the third segmentation mask, to iteratively train the deep convolutional neural network.

10. The apparatus according to claim 9, wherein said inputting the rendered image, the first segmentation mask, the observed image of the target object, and the second segmentation mask of the target object in the observed image into the deep convolutional neural network comprises:
enlarging the rendered image of the target object together with a rectangular region surrounding the second segmentation mask of the target object in the observed image, in such a manner that a 2D projection center of the 3D model of the target object is located at a center of the enlarged rendered image and that the target object in the observed image is completely located in the enlarged observed image; and
inputting the enlarged rendered image, the first segmentation mask, the enlarged observed image, and the second segmentation mask of the target object in the observed image into the deep convolutional neural network.

11. The apparatus according to claim 9, wherein the processor is further configured to, when executing the processor executable instructions, perform a 6D pose estimation, using the trained deep convolutional neural network, on a target object to be estimated by:
obtaining a rendered image and a fourth segmentation mask of the target object to be estimated by using a 3D model and an initial 6D pose estimation of the target object to be estimated;
inputting the rendered image of the target object to be estimated, the fourth segmentation mask, an observed image of the target object to be estimated, and a fifth segmentation mask of the target object to be estimated in the observed image into the trained deep convolutional neural network to obtain a 6D pose estimation; and
performing said obtaining and said inputting again by updating the initial 6D pose estimation of the target object to be estimated using the obtained relative 6D pose estimation, to iteratively improve the initial 6D pose estimation of the target object to be estimated.

12. The apparatus according to claim 11, wherein said inputting the rendered image of the target object to be estimated, the fourth segmentation mask, the observed image of the target object to be estimated, and the fifth segmentation mask of the target object to be estimated in the observed image into the trained deep convolutional neural network comprises:
enlarging the rendered image of the target object to be estimated together with a rectangular region surrounding the fifth segmentation mask of the target object to be estimated in the observed image of an initial prediction, in such a manner that a 2D projection center of the 3D model of the target object to be estimated is located at a center of the enlarged rendered image and that the target object to be estimated in the observed image is located completely in the enlarged observed image; and
inputting the enlarged rendered image, the fourth segmentation mask, the enlarged observed image, and the fifth segmentation mask of the target object to be estimated in the observed image into the trained deep convolutional neural network.

13. The apparatus according to claim 9, wherein the 6D pose estimation output by the deep convolutional neural network is represented by a relative pose transformation relative to a target pose, where the target pose is a pose of the target object in the observed image, the relative pose transformation includes a relative rotation transformation and a relative translation transformation, the relative rotation transformation takes a center point of the target object in a camera coordinate system as an origin of the camera coordinate system, and the relative translation transformation is represented by an offset and a scale change in the 2D pixel space.

14. The apparatus according to claim 9, wherein the deep convolutional neural network is constructed based on a FlowNet model for predicting the optical flow.

15. The apparatus according to claim 10, wherein the processor is further configured to, when executing the processor executable instructions: in said iteratively training, constitute a loss function based on a weighted sum of loss functions of three branches for the 6D pose estimation, the optical flow and the third segmentation mask, wherein the branches for the optical flow and for the third segmentation mask are only used for said iteratively training.

16. The apparatus according to claim 15, wherein the loss function of the branch for the 6D pose estimation is:

$$L_{pose}(p, \hat{p}) = \frac{1}{n}\sum_{j=1}^{n} L_1\left((Rx_j + t) - (\hat{R}x_j + \hat{t})\right),$$

where p=[R|t] denotes a target pose, $\hat{p}=[\hat{R}|\hat{t}]$ denotes an estimated pose, R denotes the target rotation, $\hat{R}$ denotes the estimated rotation, t denotes the target translation, $\hat{t}$ denotes the estimated translation, $x_j$ denotes coordinates of a $j_{th}$ point in the 3D model of the target object, $L_1$ denotes 1-norm, and n denotes the total number of points in the 3D model.

17. A non-volatile computer readable storage medium having computer program instructions stored thereon, wherein the computer program instructions, when being executed by a processor, perform the method according to claim 1.

* * * * *